A. W. GRAHAM.
COMBINED LEDGER TYPE MEMORIAL AND SEPULCHER.
APPLICATION FILED JAN. 22, 1917.
1,253,812.
Patented Jan. 15, 1918.
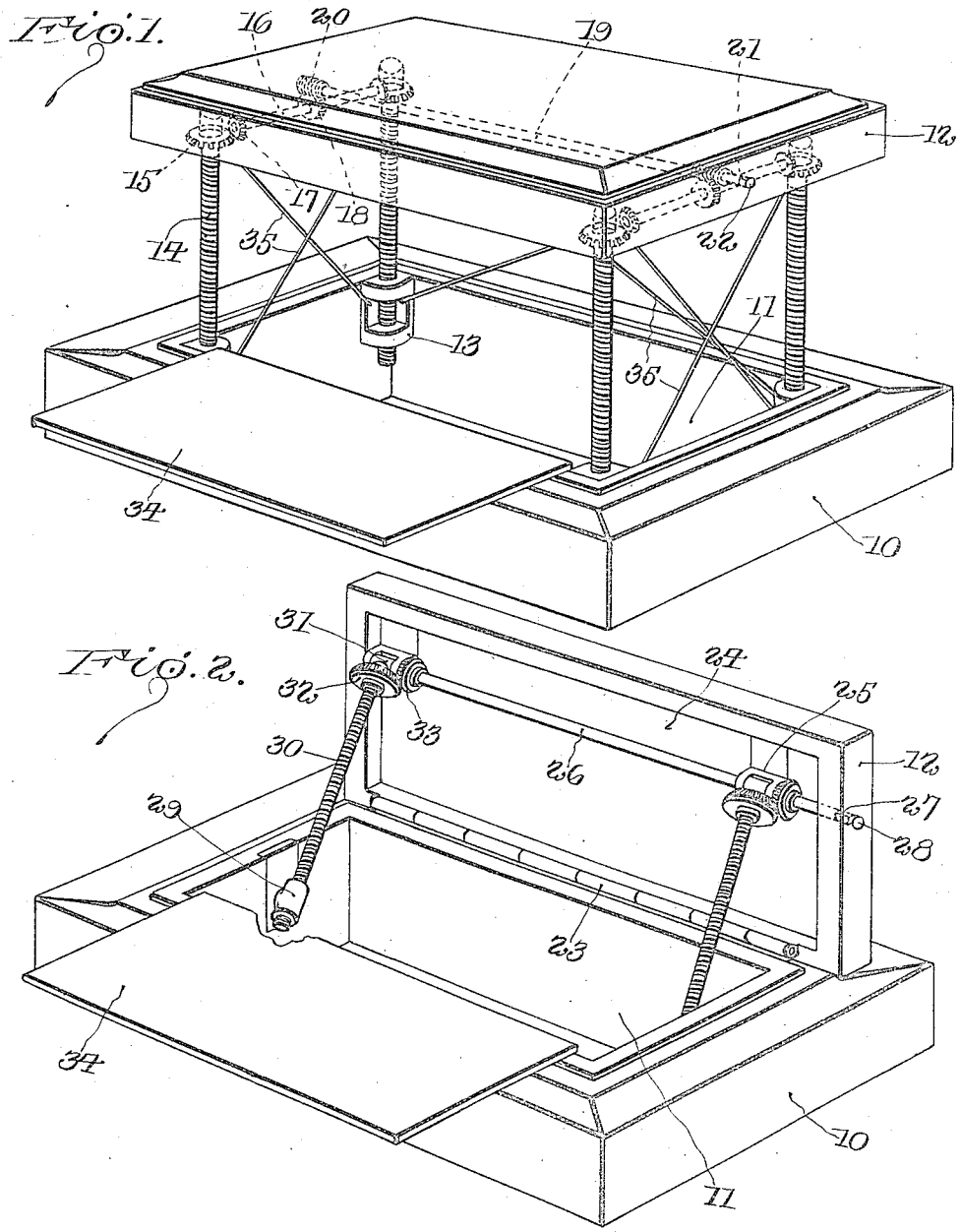

UNITED STATES PATENT OFFICE.

ANDREW W. GRAHAM, OF BUFFALO, NEW YORK, ASSIGNOR OF ONE-HALF TO ELLIS M. TREAT, OF BUFFALO, NEW YORK.

COMBINED LEDGER-TYPE MEMORIAL AND SEPULCHER.

1,253,812.  Specification of Letters Patent.  Patented Jan. 15, 1918.

Application filed January 22, 1917. Serial No. 143,729.

*To all whom it may concern:*

Be it known that I, ANDREW W. GRAHAM, a citizen of the United States, residing at Buffalo, in the county of Erie and State of New York, have invented certain new and useful Improvements in Combined Ledger-Type Memorials and Sepulchers, of which the following is a specification.

This invention relates to combined ledger type memorials and sepulchers such as are disclosed in my prior application filed August 30, 1916, Serial No. 117,696.

More particularly the invention relates to a closure for sepulchers covered by a ledger type memorial.

One important object of the invention is to improve and simplify the general construction of devices of this description.

A second important object of the invention is to provide an improved means for moving the ledger stone into and out of closing position in a device of this description.

A third important object of the invention is to provide improved means for elevating a ledger stone, in a device of this description, vertically and bodily while maintaining the stone in parallelism to its closed position, the means being normally concealed beneath the ledger stone.

A fourth important object of the invention is to provide a modification of the opening device wherein the ledger stone will be tilted on one edge by an improved mechanism normally hidden beneath such stone.

With the above and other objects in view, as will be hereinafter apparent the invention consists in general of certain novel details of construction and combinations of parts hereinafter fully described, illustrated in the accompanying drawing, and specifically claimed.

In the accompanying drawing, like characters of reference indicate like parts in the several views, and:—

Figure 1 is a perspective view of a device constructed in accordance with this invention.

Fig. 2 is a similar perspective view of a modified form of the device.

In carrying out the objects of the invention and in the form shown in Fig. 1 there is provided an underground sepulcher (not shown) such as is disclosed in my prior Patents 1,167,291 and 1,167,292 January 4, 1916. On top of this underground sepulcher and surrounding the opening thereto is a stone 10 having a central opening 11 registering with the opening in the sepulcher. Covering the opening 11 is a ledger stone 12.

In the form shown in Fig. 1 there is located at each corner of the stone 10 inside of the opening 11 a quadrantal nut 13 through each of which passes a screw 14 having a bearing in the stone 12. On each of the screws 14 is a beveled gear 15. These screws and gears being located at the corners of the oblong ledger stone are connected in pairs by means of shafts 16 on which are gears 17 meshing with the respective gears 15. Furthermore on each of the shafts 16 is provided a worm wheel 18 and extending longitudinally of the stone 12 is a main shaft 19 carrying worms 20 which mesh with respective worm wheels 18. One end of this shaft 19 is polygonal in form as at 21 and is accessible through an opening 22 in the end of the ledger stone 12. By this means a crank wrench may be applied to the polygonal end 21 to revolve the shaft 19. The revolution of this shaft 19, will through the worm and worm wheels, cause revolution of the shafts 16 which in turn will revolve the screws 14 and, since the nuts 13 are stationary, will raise or lower all four corners of the ledger stone 12 simultaneously.

In the form of the device shown in Fig. 2 one longitudinal edge of the stone 12 is preferably hinged to the stone 10 as at 23 although this hinge may, if desired, be omitted, the edge of the stone 12 acting as a fulcrum about which the stone can rotate. In this form the ledger stone 12 is preferably hollow as indicated at 24 and mounted in this hollow portion are bearings 25 wherein is journaled a shaft 26 having a polygonal end 27 accessible through an opening 28 in the end of the ledger stone. At each end of the opening 11 in this form are pivoted swivel nuts 29 through which pass elevating screws 30 having their upper ends journaled in suitable bearings 31 swiveled on the shaft 26. Moreover at the upper end of the screws 30 is a beveled gear 32 which meshes with a bevel gear 33 fixed on the shaft 26. Now by means of this construction rotation of the shaft 26 may be effected by a crank wrench and this in turn will rotate the screws 30 so that they will move through the nuts 29 and thus raise or lower the free edge of the stone 12.

It is preferred that each of the stones 10 be provided with a removable platform 34 for the purpose of receiving the casket during the interment ceremonies.

In the form shown in Fig. 1 it is desirable, in order to prevent too great elevation of the stone 12 and also to prevent any tendency to lateral movement of such stone when elevated, to connect the stones 10 and 12 by diagonally disposed flexible bronze cables 35 and these cables not only act as stop means to prevent too great elevation of the stone 12 but furthermore constitute brace means when the stone is elevated.

It will be obvious that in both forms rotation of the main shaft in one direction will open the sepulcher while rotation in the opposite direction will close the sepulcher.

There has thus been provided a simple and efficient device of the kind described and for the purpose specified.

It is obvious that many minor changes may be made in the form and construction of the invention without departing from the material principles thereof. It is not therefore desired to confine the invention to the exact form herein shown and described but it is wished to include all such as properly come within the scope claimed.

Having thus described the invention, what is claimed as new, is:—

1. In a device of the kind described a cap stone having an opening therein, a ledger stone movable to open and close said opening, a main shaft journaled on the underside of and extending longitudinally of the ledger stone and covered by said stone when in closed position, oppositely disposed screws geared to the main shaft for simultaneous revolution and nuts carried by the cap stone within the opening thereof through which said screws pass.

2. In a device of the kind described a cap stone having an opening therein, a ledger stone adapted to cover said opening, nuts arranged at the four corners of the openings in the cap stones, screws passing through said nuts and having their upper ends journaled in the ledger stone, gears on said screws, a shaft journaled on the underside of the ledger stone at each end of the ledger stone, gears on the shafts meshing with the gears on the screws, worm wheels on the shafts, a main shaft journaled on the underside of and extending longitudinally of the ledger stone, and worms on the main shaft meshing with said worm wheels.

3. In a device of the kind described a cap stone having an opening therein, a ledger stone adapted to cover said opening, nuts arranged at the four corners of the openings in the cap stones, screws passing through said nuts and having their upper ends journaled in the ledger stone, gears on said screws, a shaft at each end of the ledger stone, gears on the shafts meshing with the gears on the screws, worm wheels on the shafts, a main shaft extending longitudinally of the ledger stone, worms on the main shaft meshing with said worm wheels, and diagonally disposed flexible cables connecting opposite corners of the ledger and cap stones and constituting stop and brace means when the ledger stone is raised.

4. In a device of the kind described, a cap stone having an elongated rectangular opening, a ledger stone adapted to close said opening and having one edge fulcrumed on the cap stone adjacent the opening, nuts swiveled to opposite ends of the cap stone within the opening, a main shaft extending parallel to said edge of the ledger stone and journaled to said ledger stone, bearings swiveled on said shaft, elevating screws extending through said nuts and having their upper ends journaled in said bearings, gears on the upper ends of said screws, gears on said shaft meshing with the first-mentioned gears and the polygonal end of said shaft adapted to receive a crank wrench.

In testimony whereof I affix my signature in the presence of two witnesses.

ANDREW W. GRAHAM.

Witnesses:
 A. M. PARKINS,
 ALBERT POPKINS.

Copies of this patent may be obtained for five cents each, by addressing the "Commissioner of Patents, Washington, D. C."